United States Patent [19]

Erismann

[11] 4,090,360

[45] May 23, 1978

[54] SINGLE CHAMBER TYPE COMBUSTION STRUCTURE FOR A GAS TURBINE ENGINE

[75] Inventor: Oskar Erismann, Baden, Switzerland

[73] Assignee: BBC Brown Boveri & Company Limited, Baden, Switzerland

[21] Appl. No.: 685,774

[22] Filed: May 12, 1976

[30] Foreign Application Priority Data

Jun. 25, 1975 Switzerland ........................ 8238/75

[51] Int. Cl.$^{2}$ ............................ F02C 3/14; F02C 9/14

[52] U.S. Cl. .................................... 60/39.29; 60/39.65

[58] Field of Search ................. 60/39.37, 39.29, 39.65, 60/39.23

[56] References Cited

U.S. PATENT DOCUMENTS

| | | | |
|---|---|---|---|
| 2,408,743 | 10/1946 | Elliott | 60/39.37 |
| 3,133,416 | 5/1964 | Mock | 60/39.29 |
| 3,280,555 | 10/1966 | Charpentier et al. | 60/39.29 |
| 3,577,878 | 5/1971 | Burnley et al. | 60/39.29 |

FOREIGN PATENT DOCUMENTS

| | | | |
|---|---|---|---|
| 1,136,719 | 12/1955 | France | 60/39.29 |

*Primary Examiner*—Robert E. Garrett
*Attorney, Agent, or Firm*—Burns, Doane, Swecker & Mathis

[57] ABSTRACT

A single chamber type combustion structure particularly for industrial gas turbine plants in which the axis of the chamber forms a perpendicular to the axis of the compressor-turbine group wherein primary combustion air, delivered by the compressor coupled to the turbine driven by the combustion gases, flows through an annular duct formed between concentric outer and inner walls of the single combustion chamber from one end thereof to the other where its direction is then reversed for flow into the combustion zone within the inner wall through a rotatable vortex blading surrounding a fuel burner. A circular assembly of circumferentially spaced adjustable air deflector vanes is mounted in the annular duct for controlling the distribution of the primary air flowing through the duct prior to entry to the rotatable vortex blading.

The combustion gases discharged from the combustion chamber enter the turbine by way of an annular nozzle concentric with the turbine inlet.

1 Claim, 7 Drawing Figures

Figure 2:
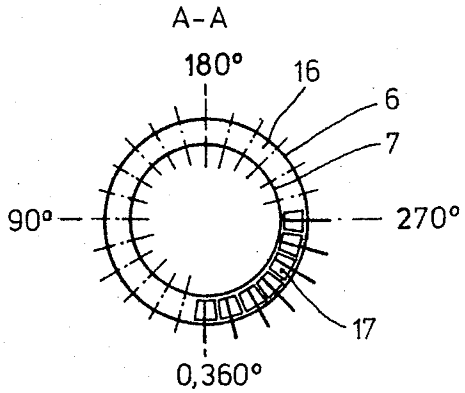

Fig. 5
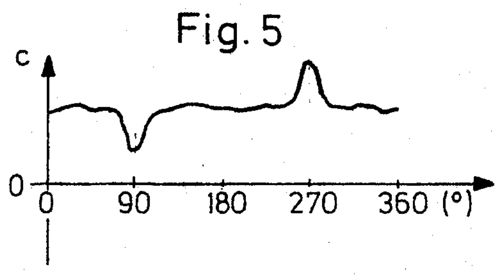
Fig. 6
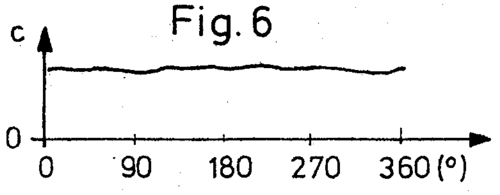
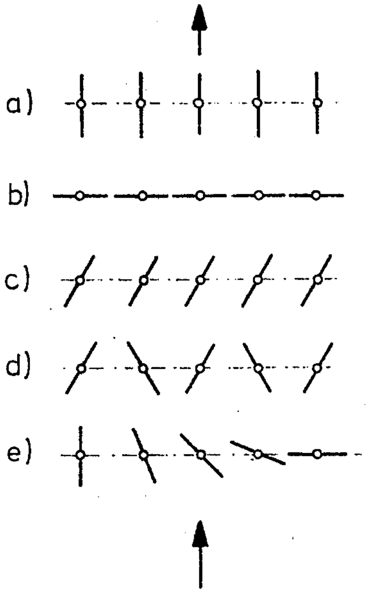
Fig. 7
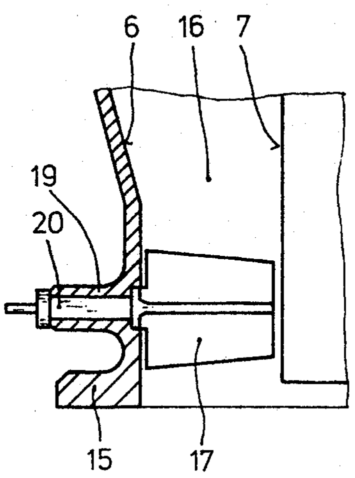
Fig. 3
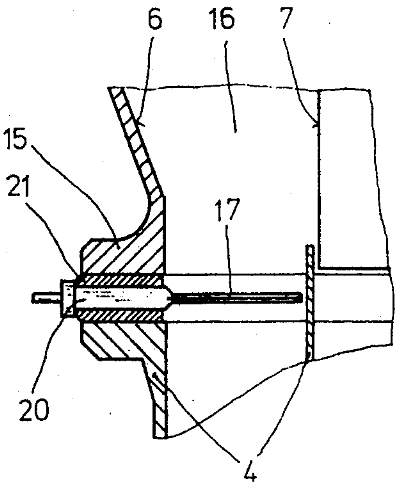
Fig. 4

SINGLE CHAMBER TYPE COMBUSTION STRUCTURE FOR A GAS TURBINE ENGINE

This invention relates to an improvement in a combustion chamber, especially for use in an industrial gas turbine plant, where the compressed air flows in the form of a countercurrent from the air intake of the combustion chamber to the primary air entrance which is provided with vortex blading.

Combustion chambers of this type are known (Dubbels Taschenbuch fur den Maschinenbau, Sass-Bouche-Leitner, volume II, published by Springer 1961 Berlin/-Goettingen/Heidelberg, page 378, FIG. 120) and are usually arranged in connection with industrial gas turbines as a single-chamber system. One of their advantages over multi-chamber systems is due to the fact that they will overcome the difficulties arising from an exact sub-division of air and fuel.

However, it is well known that in case of a single-chamber system the air is guided toward the compressor with lesser effectiveness than — for example — in case of an annular combustion chamber that is arranged symmetrically to the machine axis and is provided with several chambers.

It is the primary objective of this invention to improve in an advantageous manner the known construction relative to uniform admission to the primary air entrance. The invention solves this problem in that a number of rotatable deflectors are arranged upstream of the primary air entrance to the combustion chamber.

The invention is particularly advantageous because it enhances the operating efficiency of the combustion chamber, and thusly of the entire system.

In the case of a preferred embodiment of the invention it is feasible to arrange the deflectors within an annular duct near the air intake of the combustion chamber. This arrangement offers the advantage that not only the primary air but also the secondary air will flow into the combustion chamber and the mixing zone uniformly and also symmetrically with respect to rotation. Furthermore, the flow to be corrected can now travel over a greater distance for equalization. The arrangement of the deflectors at the intake of the combustion chamber is also expedient engineering-wise because installation as well as operation can be easily accomplished there. It will further be advantageous if the deflectors are able to turn about their mounting axis independently of each other, thus making feasible an optimum fine distribution of of the flow throughout the flow duct.

Preferred embodiments of the invention will now be described and these are illustrated in the accompanying drawings, components not necessary for the understanding of the idea of the invention having been omitted.

Figure 1:
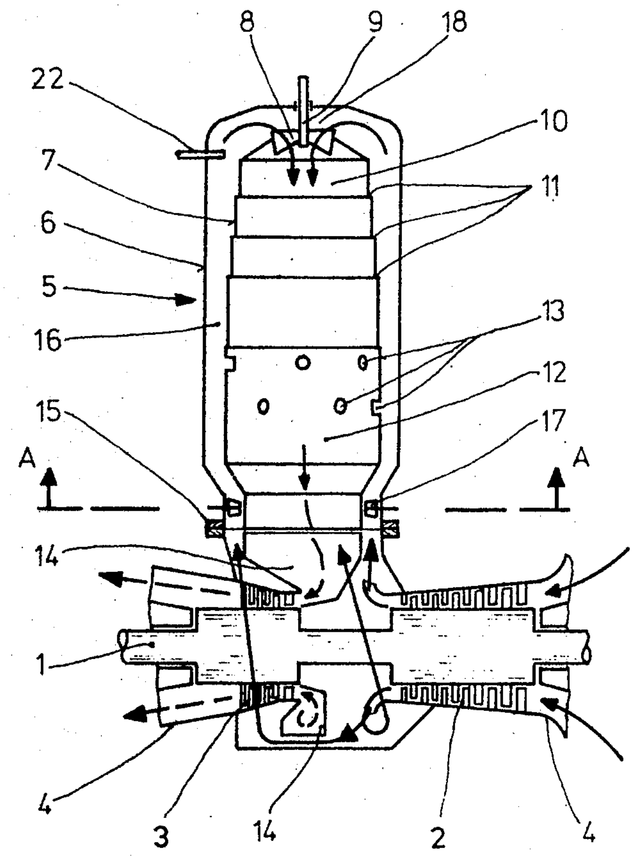

In the drawings:

FIG. 1 shows the primary thermal components of a gas turbine plant including a combustion chamber interposed between and perpendicular to the axis of coupled compressor and turbine components, FIG. 2 is a transverse sectional view through the combustion chamber taken along line A—A of FIG. 1, FIG. 3 is a section view of the air entrance portion of the combustion chamber from the compressor showing one embodiment of the circumferentially arranged, rotationally adjustable air deflectors, FIG. 4 is a view similar to FIG. 3 but showing a somewhat different manner for mounting the air deflectors, FIG. 5 is a graft depicting the velocity division of the combustion air about the axis of the annular entrance chamber from the compressor outlet in a construction wherein deflectors in accordance with the present invention are not utilized;

FIG. 6 is a graft similar to FIG. 5 depicting the velocity division of the combustion air with the addition of rotationally adjustable air deflectors in accordance with the invention, and FIG. 7 is a diagrammatic presentation illustrating the deflectors in different positions of adjustment about their mounting axis.

With reference now to FIG. 1 which depicts the main thermal components of a gas turbine plant, it will be seen that an axial flow compressor 2 is mounted on the same shaft 1 with an axial flow turbine 3 within a housing structure generally indicated at 4. The combustion chamber 5 is located intermediate the compressor and turbine, and is positioned perpendicular to the compressor-turbine axis, the compressor delivering compressed air into the chamber 5 for combustion, and the hot combustion gases in turn being delivered to the turbine 3. As depicted by the directional arrows, compressed air flows from compressor 2 into and through annular duct 16 formed between concentric spaced outer and inner walls 6 and 7 respectively of the combustion chamber to the opposite end of the latter at which its direction is then reversed for flow into the combustion zone 10 formed within a series of stepped diameter walls 7 through the primary air entrance end 18 which is provided with a revolving member 8 having the form of a vortex blading. The latter surrounds the fuel nozzle or burner 9 through which fuel is admitted to admix and combust with the primary air intake.

The revolving vortex blading 8 will create a rotational flow of air with one core of the latter directed towards burner 9 thus fixing the flame at the burner so that it will not break away and become extinguished, even at a high air velocity. This turbulent air flow will at the same time assure a rapid combustion. The rotational vortex blading 8 is designed in such manner that its inner ring will surround burner 9, thus creating around the burner an annular zone with an axial air flow. If this annular zone is not uniform, for example due to an asymmetrical load, the back flow generated within the vortex core will force the flame into the vicinity of the burner and to the revolving vortex blading because the quantity of axial flow air will then be too small at one point, with the result that the blading will become overheated and possibly damaged.

Secondary air flows at secondary air zones 11 into the combustion zone 10 from the annular duct 16 protecting the inner walls 7 of the combustion chamber from overheating by the formation of an air veil.

A proper mixing of the hot outflowing combustion gases is accomplished in the mixing zone 12 by the introduction of secondary air through the apertures 13 in the inner wall 7. The high degree of turbulence so attained will result in a uniform distribution of temperature at the combustion chamber outlet, from where the combustion gases reach the entrance to gas turbine 3 by way of nozzle 14 which is designed in the form of an annular passage adjacent to end concentric with the turbine inlet.

A symmetrical loading of the vortex blades is absolutely necessary in order to operate the combustion chamber in a safe manner for the reasons explained above.

FIG. 1 illustrates by arrows the inflow from the compressor outlet to the combustion chamber which is nonuniform and subject to rotation. It can be seen clearly that the major portion of the compressed air is hitting the right side of the annular duct 16.

Known solutions, for example longitudinal guide vanes between the outer wall 6 and the inner wall 7 can straighten out the the flow under rotational influence but are not able to distribute uniformly the volume throughout the annular duct 16. The invention proposes the arrangement of deflectors 17 within the annular duct 16, namely immediately at the air intake, i.e., at the flange 15 which connects the lower end of the combustion chamber structure 5 to the housing structure 4 for the compressor-turbine set 2,3.

As shown in FIG. 2 a total of twenty-four deflectors 17 fill the annular space 16. Each of these deflectors 17 is rotationally adjustable and one construction for mounting the deflectors is illustrated in FIG. 3. Here it will be seen that each deflector is constructed in the form of a vane and includes a shaft portion 20 rotationally mounted in a radially directed bearing bore provided in a ring-shaped boss 19 which forms an integral part of the outer wall 6 of the combustion chamber. The outer end of the shaft portion 20 protrudes beyond the boss 19 and is adapted to receive a tool such as a lever, fork wrench, handle or the like so that the deflector vane 17 can be adjusted to any desired position. In the position depicted in FIG. 3, the deflector vane 17 lies in a vertical plane.

A slight modification from FIG. 3 for mounting each deflector 17 is depicted in FIG. 4 where it will be seen the outer wall 6 of the combustion chamber includes a pair of juxtaposed flanges 15 between which a flat-sided ring 21 is secured, and this ring is provided with the circumferentially spaced radially extending bores each for receiving the shaft portion 20 of a deflector. This embodiment is particularly suitable for installation of the invention in an already existing compressor-turbine-combustion chamber system. In FIG. 4, the deflector vane 17 is shown in the horizontal position, i.e. the position depicted by the deflectors in FIG. 2.

Sealing means are provided for the deflector installations of FIGS. 3 and 4 but these have not been included in order to simplify the disclosure.

The arrangement proposed by the invention operates as follows:

The velocity field which exists at diverse operating points of the gas turbine plant is checked by use of measuring sensors upstream of the primary air entrance 18. Several flow sondes 22, arranged circumferentially, will determine the angle of twist and the flow velocity within a zone of flow that is rotationally symmetrical, preferably within the annular duct 16 at the level of the primary zone 10.

In order to enable one to better understand the problem, the case where all deflectors 17 are in the open position (as shown in FIG. 3) will first be discussed. Since the vanes 17 are at a very slight elevation only, they will exert solely a very small and negligible straightening influence, and the air velocity division, as determined by the sondes 22, will approximate the division as it exists for systems which represent the present state of art.

The graph of FIG. 5 shows the air velocity division as measured at a certain diameter of the annular duct 16. Along the abscissa there are plotted the projected perimeter by degrees in accordance with FIG. 2, and at the ordinate the velocity value c. Absolute values are not given for the latter since they are not meaningful in view of their functional relation to a very large number of parameters. The graph shown in FIG. 5 depicts the flow conditions at full load. Relative to the mean value of the velocity there can be seen positive and negative peak values at the zones of 270° and 90° respectively. It follows from the conditions shown that the load of the revolving vortex member 8 is not uniform, and that the above-mentioned annular air flow around the burner 9 can form in a very imperfect manner only.

It should be mentioned that for reasons of clarity the presence of a purely axial flow within the annular duct 16 was assumed, with the graduation according to FIG. 2 and the graduation according to FIG. 5 examined on the basis of the same reference point. Actually, the flow within the annular duct 16 is subjected to a twist, depending on the relevant point of operations; the run of the curve will be similar to the graph illustrated but the velocity peaks and the depressions can occur at various other degrees about the axis of the combustion chamber.

The installations proposed by the invention do permit a uniform quantitative distribution of the air, beginning in the lower portion of the combustion chamber 5 which surrounds the mixing zone 12. The vanes 17 can be rotationally adjusted to any position up to 180°, and several positions are illustrated in FIG. 7, with the direction of flow indicated by arrows. Only a section of five units, among the total of 24 vanes seen in FIG. 2 is shown in development and considered here:

- position a) corresponds to the above discussed (open) position; there is no correction.
- position b) shows a completely closed vane arrangement; there is no air flow-through.
- position c) solely corrects the exit angle but hardly influences the quantitative distribution.
- d) can correct velocity peaks and depressions.
- position e) shows the progressive opening from the right toward the left of the sectional flow area; it makes possible the shifting and the equalization of the flow toward the left.

Obviously, it is possible to combine all these positions in order to attain the maximum equalizing effect.

The velocity conditions can be measured by means of the sondes 22 at the time of starting, during idling, and as well at partial and full load of the machine, and the conditions can be corrected and brought to the desired state by the adjustment of individual vanes 17, groups of vanes or all vanes.

The graph of FIG. 6 depicts the run of a velocity curve, resulting from such correction. The proportions of the two graphs in FIGS. 5 and 6 are identical, thus allowing a qualitative comparison.

There are no noticable peaks, neither positive nor negative; it goes without saying that the run of the curve could be made smoother still by a corresponding expenditure of a greater time. The velocity division anglewise, measured within the annular duct 16, and as the result thereof the air flow toward the revolving vortex member 8, is now very uniform, thus insuring a proper combustion. The uniform quantitative distribution of compressed air within the annular duct 16 also causes a more uniform flow of the secondary air into the combustion space, a factor which is particularly important in the case of all-metal combustion chamber structures. Furthermore, the greater uniformity of the flow conditions results in an improved blending of the outflowing gases with the secondary air within the mixing zone 12.

Obviously, the invention is not limited to the species illustrated by drawing since horizontally arranged combustion chambers can also be provided with the rotationally adjustable deflectors, instead of the illustrated vertically placed combustion chamber. Furthermore, neither the number nor the shape of the deflectors to be used is critical.

Obviously, the deflectors can also be arranged at any other point within the annular duct, for example immediately below the flow sondes measuring 22, in the event that it is not desired to make the mixed flow uniform.

Finally, it is possible to automate the measurements by the sondes with a coupled automatic vane adjustment, and the actuation of the deflectors by groups is also considered to come within the scope of this invention.

I claim:

1. An industrial gas turbine plant comprising a compressor coupled to a turbine, a single chamber type combustion structure interposed between said compressor and turbine for receiving compressed air from the compressor and delivering hot combustion gas to the turbine inlet, said single chamber combustion structure comprising concentric inner and outer walls forming an annular duct therebetween, one end of said annular duct being connected to the outlet from said compressor and the other end of said annular duct leading into one end of the combustion zone formed within said inner wall through a rotatable vortex blading surrounding a fuel burner, the other end of said combustion zone being connected to the inlet to said turbine, and a circular assembly of circumferentially spaced air deflector vanes located in said annular duct adjacent the compressed air inlet thereto, said deflector vanes being adjustable independently of each other about an axis extending radially of said combustion chamber structure through a range between positions transverse and parallel respectively to the direction of air flow through said annular duct, and said vanes being disposed at different angles around said annular duct to compensate out non-uniformities in air flow from the outlet of said compressor into said annular duct thereby to achieve a uniform distribution of air flow through said duct to said rotatable vortex blading.

* * * * *